United States Patent
Narayanan et al.

(10) Patent No.: US 11,010,813 B2
(45) Date of Patent: May 18, 2021

(54) SYSTEM FOR BUILDING GROCERY BASKET AND METHOD OF USING SAME

(71) Applicant: WALMART APOLLO, LLC, Bentonville, AR (US)

(72) Inventors: Hemanth Kumar Narayanan, Leeds (GB); Richard Doyle, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 504 days.

(21) Appl. No.: 15/379,182

(22) Filed: Dec. 14, 2016

(65) Prior Publication Data

US 2018/0165743 A1    Jun. 14, 2018

(51) Int. Cl.
  *G06Q 30/00* (2012.01)
  *G06Q 30/06* (2012.01)
  *G06F 16/532* (2019.01)
  *G06N 3/04* (2006.01)

(52) U.S. Cl.
  CPC ....... *G06Q 30/0631* (2013.01); *G06F 16/532* (2019.01); *G06Q 30/0625* (2013.01); *G06Q 30/0633* (2013.01); *G06Q 30/0643* (2013.01); *G06N 3/0445* (2013.01)

(58) Field of Classification Search
  CPC .................................................. G06Q 30/00
  See application file for complete search history.

(56) References Cited

U.S. PATENT DOCUMENTS

| | | | |
|---|---|---|---|
| 6,587,835 B1 | 7/2003 | Treyz et al. | |
| 7,751,971 B2 | 7/2010 | Chang et al. | |
| 8,577,602 B2 | 11/2013 | Walder | |
| 8,731,817 B2 | 5/2014 | Ballew et al. | |
| 8,818,706 B1 | 8/2014 | Ogale et al. | |
| 9,864,951 B1 * | 1/2018 | Makhijani | G06F 17/276 |

(Continued)

FOREIGN PATENT DOCUMENTS

JP    2000030148 A    1/2000

OTHER PUBLICATIONS

Six New Apps That Use Tinder's "Swipe Theory." Jul. 21, 2014 <https://www.fastcompany.com/3033319/six-new-apps-that-use-tinders-swipe-theory> (Year: 2014).*

(Continued)

*Primary Examiner* — Abby J Flynn
(74) *Attorney, Agent, or Firm* — Bryan Cave Leighton Paisner LLP

(57) ABSTRACT

A system and method includes presenting a single product to be located in the retail store to the customer using a mobile application running on the mobile device, receiving an indication from the customer either to dismiss the product or to add the product to a grocery basket of the mobile application to form user data, presenting a cue card to ask the customer a question, receiving an answer from the customer as to yes or no to the question to form cue card data, using a data model and an algorithm to predict the most probable product the customer is going to want to add to the grocery basket, transmitting a representation of the most probable product, and displaying the most probable product on a graphical display of the mobile device, wherein the most probable product is based on the user data and the cue card data.

20 Claims, 9 Drawing Sheets

(56) References Cited

U.S. PATENT DOCUMENTS

| | | |
|---|---|---|
| 2006/0173617 A1 | 8/2006 | Sladky et al. |
| 2008/0180637 A1 | 7/2008 | Kjeldsen et al. |
| 2009/0234712 A1* | 9/2009 | Kolawa .................. G06Q 30/02 705/14.4 |
| 2010/0169336 A1 | 7/2010 | Eckhoff-Hornback et al. |
| 2010/0318412 A1* | 12/2010 | Karypis .................. G06Q 30/02 705/14.1 |
| 2011/0145093 A1* | 6/2011 | Paradise ................ G06Q 30/02 705/26.41 |
| 2011/0183732 A1 | 7/2011 | Block et al. |
| 2011/0320275 A1 | 12/2011 | O'Sullivan et al. |
| 2012/0123673 A1 | 5/2012 | Perks et al. |
| 2012/0123674 A1 | 5/2012 | Perks et al. |
| 2013/0282533 A1 | 10/2013 | Foran-Owens et al. |
| 2014/0007022 A1* | 1/2014 | Tocino Diaz ........... G06F 3/017 715/863 |
| 2014/0122469 A1* | 5/2014 | Chang .................... G06Q 30/06 707/725 |
| 2014/0358711 A1* | 12/2014 | Arbogast ........... G06Q 30/0601 705/26.1 |
| 2015/0051994 A1 | 2/2015 | Ward et al. |
| 2015/0062073 A1* | 3/2015 | Heikel .................... G06F 3/041 345/174 |
| 2015/0185990 A1 | 7/2015 | Thompson |
| 2015/0269645 A1* | 9/2015 | Gibson ............... G06Q 30/0631 705/26.7 |
| 2016/0041000 A1 | 2/2016 | Nallu et al. |
| 2016/0132607 A1* | 5/2016 | Skatell ................ G06F 16/9535 707/734 |
| 2017/0262618 A1* | 9/2017 | Thiese ................ G06F 16/2379 |

OTHER PUBLICATIONS

Peterson, Hayley. "Tinder culture has taken over, and now it's killing retail." Oct. 15, 2016 <https://www.businessinsider.com/tinder-culture-is-hurting-retailers-2016-10> (Year: 2016).*

Schafer, J.B., Konstan, J.A. & Riedl, J. E-Commerce Recommendation Applications. Data Mining and Knowledge Discovery 5, 115-153 (2001). https://doi.org/10.1023/A:1009804230409 (Year: 2001).*

* cited by examiner

SYSTEM FOR BUILDING GROCERY BASKET AND METHOD OF USING SAME

BACKGROUND OF THE INVENTION

1. Field of the Invention

The present invention relates generally to retail stores and, more particularly, to a system for building a grocery basket for a retail store and method of using same.

2. Description of the Related Art

It is known that a large retailer typically has a number of retail stores with items or products stocked in the retail stores. Many consumers visit a specific retail store when shopping for products, for example, groceries, office supplies, household wares, etc. Typically, a customer may use a mobile device running a mobile application of the retailer to identify an item or product within the retail store. For a retailer, traffic for groceries on a mobile device may be almost forty-seven percent in some cases. Currently, for example, a new customer takes approximately fifty-one minutes to complete their first shop on a mobile device versus a returning customer who takes approximately twenty-five minutes. For example, a first time shopper conversion on a mobile device is approximately twenty-three percent whereas a first time shopper conversion on a desktop computer is approximately forty-three percent. As a result, it is desirable to increase a first time shopper conversion rate on a mobile device to levels of a first time shopper conversion rate on a desktop computer to increase revenue and value to these retailers.

In addition, new customers or first time shoppers add an average of thirty-five items before they checkout. New customers do not have favorites, which means they have to use search and browse functions that are heavy on interaction and therefore take more time. Typically, the retailer knows very little about a new customer as they are only required to enter a postal code to start shopping. This means the retailer's ability to customize the experience is extremely limited.

It is, therefore, desirable to provide a new system and method that allows new or return customers to add items or products that they like quickly to reduce the time to shop for a retail store. It is also desirable to provide a new system and method that allows a retailer to learn about a customer without asking for lots of information up front so that the retailer can customize the user experience. It is further desirable to provide a new system and method that learns as the retailer collects more data so the service gets incrementally better the more it is used to encourage customer loyalty and to retain customers for the retailer. Thus, there is a need in the art to provide a system for building a grocery basket for a retail store and method of using same that meets at least one of these desires.

SUMMARY OF THE INVENTION

Accordingly, the present invention provides a system including a computer system configured to provide output of a retail store over a network to a mobile device of a customer. The computer system is configured to present a single product to be located in the retail store to the customer using a mobile application running on the mobile device, to receive from the mobile device an indication from the customer either to dismiss the product or to add the product to a grocery basket of the mobile application to form user data, to present a cue card to the mobile device to ask the customer a question, and to receive from the mobile device an answer from the customer as to yes or no to the question to form cue card data. The computer system is also configured to use a data model and an algorithm to predict a most probable product the customer is going to want to add to the grocery basket, to transmit to the mobile device a representation of the most probable product, and to display the most probable product on a graphical display of the mobile device, wherein the most probable product is based on the user data and the cue card data.

In addition, the present invention provides a method including the steps of presenting, by a computer system, a single product to be located in a retail store to a customer using a mobile application running on a mobile device. The method also includes the steps of receiving, by the computer system from the mobile device, an indication from the customer either to dismiss the product or to add the product to a grocery basket of the mobile application to form user data. The method includes the steps of presenting, by the computer system to the mobile device, a cue card to ask the customer a question, receiving, by the computer system from the mobile device, an answer from the customer as to yes or no to the question to form cue card data, and using, by the computer system, a data model and an algorithm to predict a most probable product the customer is going to want to add to the grocery basket. The method further includes the steps of transmitting, by the computer system to the mobile device, a representation of the most probable product, and displaying, by the computer system, the most probable product on a graphical display of the mobile device, wherein the most probable product is based on the user data and the cue card data.

Further, the present invention provides one or more non-transitory computer-readable storage media, having computer-executable instructions embodied thereon, wherein when executed by at least one processor. The computer-executable instructions cause the processor to present a single product to be located in a retail store to a customer into a mobile application running on a mobile device and to receive an indication from the customer either to dismiss the product or to add the product to a grocery basket of the mobile application to form user data. The computer-executable instructions also cause the processor to present a cue card to ask the customer a question, to receive an answer from the customer as to yes or no to the question to form cue card data, and to use a data model and an algorithm to predict a most probable product the customer is going to want to add to the grocery basket. The computer-executable instructions further cause the processor to transmit a representation of the most probable product, and to display the most probable product, wherein the most probable product is based on the user data and the cue card data.

One advantage of the present invention is that a new system and method is provided for building a grocery basket for a retail store of a large retailer. Another advantage of the present invention is that the system and method provides a mobile application that allows new customers or users to build their initial grocery basket and learns about the user preferences for future shops of products within the retail store. Yet another advantage of the present invention is that the system and method provides an easy to use interface that shows only one product and has only two actions to either dismiss or add to a grocery basket. Still another advantage of the present invention is that the system and method provides a grocery machine based learning system using a recurrent neural network, Tensorflow™, working on historical purchase data and user preferences to predict the most likely product to show the user next. A further advantage of the present invention is that the system and method uses small micro surveys to learn more about the customer and to feed this back into a data model for the machine based learning system.

Other features and advantages of the present invention will be readily appreciated, as the same becomes better understood, after reading the subsequent description taken in conjunction with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
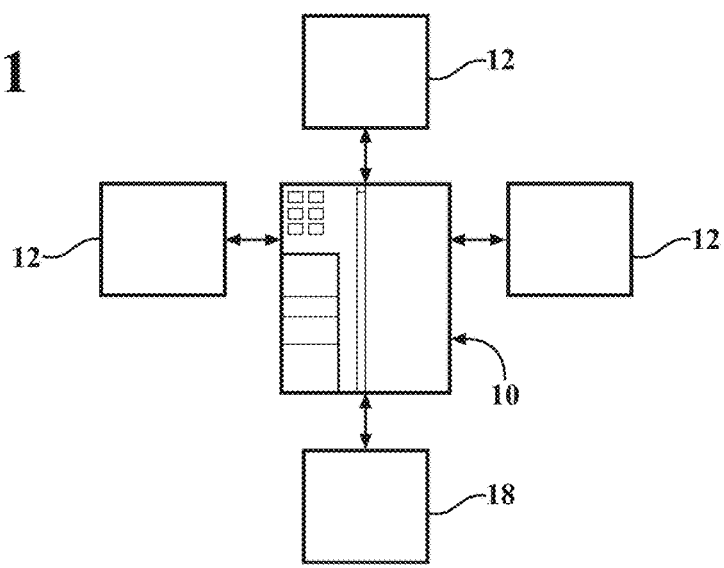
FIG. 1 is a diagrammatic view of a system for building a grocery basket for a retail store, according to one embodiment of the present invention, illustrated in relationship with at least one mobile device of a customer.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE PREFERRED EMBODIMENT(S)

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The disclosure particularly describes a mobile application to help a new user or customer of a retailer build their initial grocery basket and learn about the user preferences for future shops of the retailer. Particularly, the present disclosure describes how a system and method allows a user or customer of a retailer to build their grocery basket.

With reference to the FIGS. and in operation, the present invention provides a system 10, methods, and computer product media, which facilitates a user or customer of a retailer to build their grocery basket for a retail store. In particular, the present invention produces a mobile application that helps a new user or customer of a retailer build their initial grocery basket by either dismissing or adding a specific brand or product to their grocery basket within the retail store.

Referring to FIG. 1, an exemplary environment in which the system 10 for building a grocery basket for a retail store 12, according to the present invention, operates is illustrated. The system 10 may be configured for a large retailer having one or more retail stores 12 each having one or more items or products in the retail stores 12. The term "retail store" can include brick-and-mortar stores operated by a single retailer, e.g., supermarket or superstore, or a location that includes stores operated by multiple retailers, e.g., a shopping mall or a shopping plaza. It should also be appreciated that the retail store 12 may be an on-line or electronic retail store.

Figure 2:
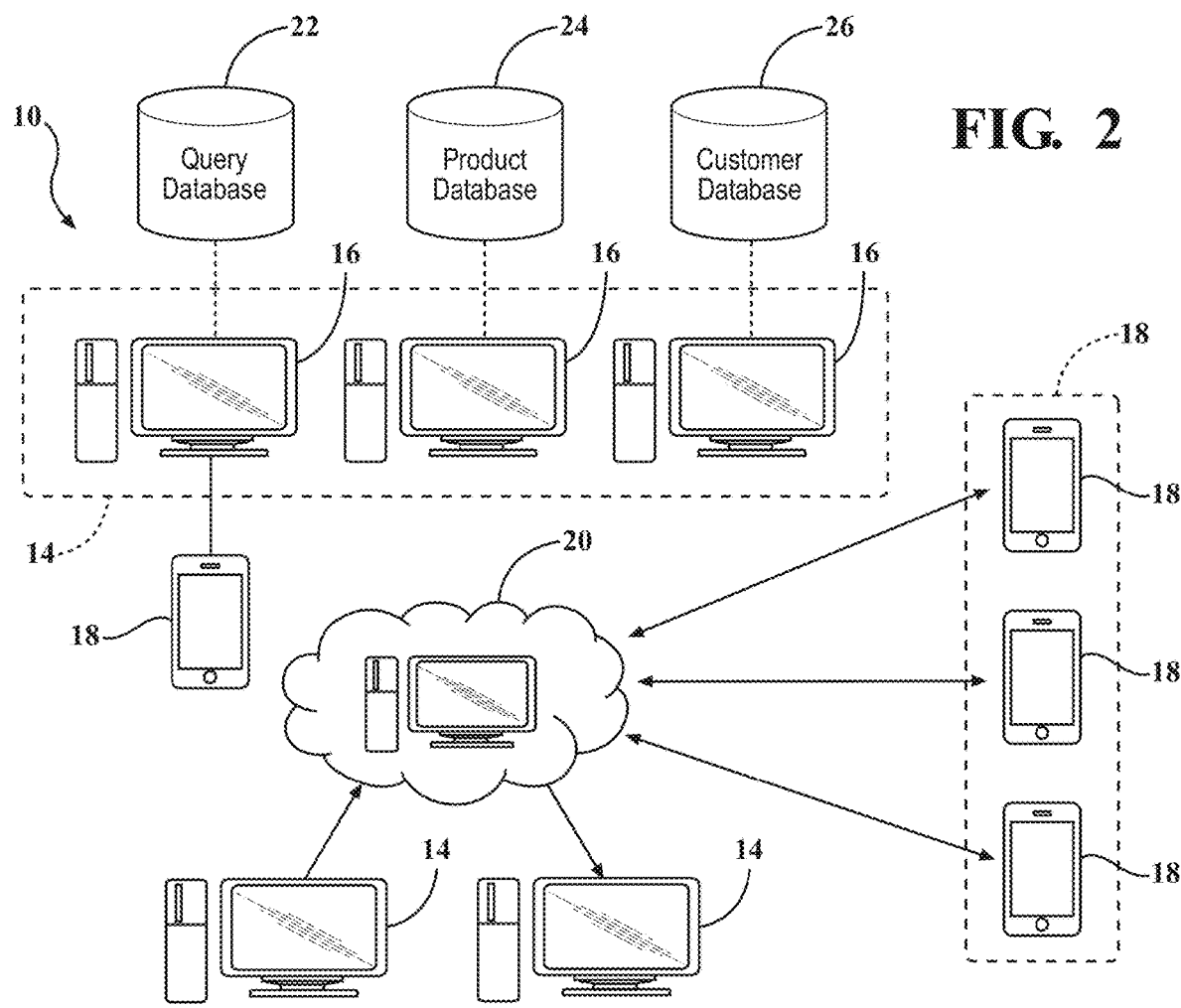
FIG. 2 is another diagrammatic view of the system of FIG. 1.

Referring to FIG. 2, the system 10 may include one or more server systems 14 that may each be embodied as one or more server computers 16 each including one or more processors that are in data communication with one another. The server system 14 may be in data communication with one or more customer devices. In the system 10 and method disclosed herein, the customer devices may be embodied as mobile devices 18, mobile computers, or other computing device such as a mobile phone or tablet computer.

For clarity in discussing the various functions of the system 10, multiple computers and/or servers are discussed as performing different functions. These different computers (or servers) may, however, be implemented in multiple different ways such as modules within a single computer, as nodes of a computer system, etc . . . . The functions as performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

Some or all of the server systems 14, servers, or server computers 16 and customer devices or mobile devices 18 may communicate with one another by means of a network 20. The network 20 may be embodied as a peer-to-peer connection between devices, a connection through a local area network (LAN), WiFi network, the Internet, or any other communication medium or system. Each of the server systems 14 or server computers 16 may be coupled to one another by separate networks or some or all of the server systems 14 or server computers 16 may share a common network. For example, in some embodiments, the server systems 14 or server computers 16 may communicate over a separate private network, rather than over the network 20.

Referring again to FIG. 2, the server system 14 may be associated with a retailer, or other entity, providing search services. For example, the server system 14 may host a search engine or a site hosted by a retailer to provide access to information about products and user opinions about products. For example, the server system 14 may host or access a query database 22, product database 24, and customer database 26, which may be coupled to the server system 14 or server computers 16.

The system 10 described herein may make use of data known about queries and user responses to queries. Accordingly, the server system 14 may host or access the query database 22 of queries. A record for a query may include a cue card and an answer to a question on the cue card. For example, a record of a query may include a record of the cue card and the answer for the cue card provided by the user. Another example of a record of a query may include a record of a search inquiry.

The system 10 described herein may make use of product data for products located in the retail store 12. Accordingly, the server system 14 may host or access the product database 24 of products located in the retail store 12. The product database 24 may store a plurality of product records. The product records may have one or more brands associated therewith. A brand for a product may represent the manufacturer, seller, importer, or the like for a product and/or a manufacturer of a component part of a product, or other reference to an entity participating in the production and offer for sale of a product.

The system 10 described herein may make use of customer data for customers of the retail store 12. Accordingly, the server system 14 may host or access a customer database 26 containing historical purchases of customers of the retail store 12. The customer database 26 may store a plurality of customer records for a plurality of retail stores 12. It should be appreciated that each customer record is produced from customer information and/or customer purchases.

Figure 3:
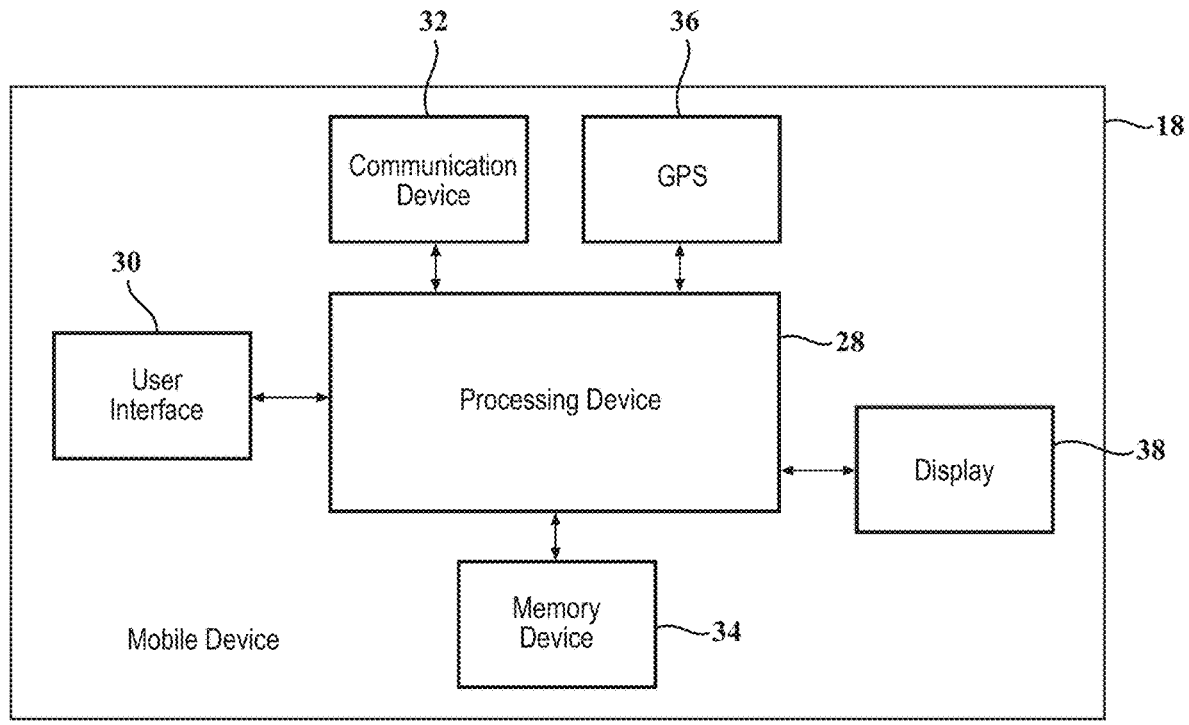
FIG. 3 is a diagrammatic view of a mobile device used with the system of FIG. 1.

Referring now to FIG. 3, a schematic illustrating example components of one mobile device 18 of FIG. 1 is illustrated. In the illustrative embodiment, the mobile device 18 includes a processing device 28, a user interface 30, a communication device 32, a memory device 34, a global positioning system (GPS) 36, and a display 38. It should be appreciated that the mobile device 18 can include other components and some of the components are not required.

The processing device 28 can include memory, e.g., read only memory (ROM) and random access memory (RAM), storing processor-executable instructions and one or more processors that execute the processor-executable instructions. In embodiments where the processing device 28 includes two or more processors, the processors can operate in a parallel or distributed manner. The processing device 28 can execute the operating system of the mobile device 18.

The user interface 30 is a device that allows a user to interact with the mobile device 18. While one user interface 30 is shown, the term "user interface" can include, but is not limited to, a touch screen, a physical keyboard, a mouse, a microphone, and/or a speaker. The communication device 32 is a device that allows the mobile device 18 to communicate with another device, e.g., the server system 14 or server computer 16, via the network 20. The communication device 32 can include one or more wireless transceivers for performing wireless communication and/or one or more communication ports for performing wired communication. The memory device 34 is a device that stores data generated or received by the mobile device 18. The memory device 34 can include, but is not limited to, a hard disc drive, an optical disc drive, and/or a flash memory drive.

The GPS 36 is a device that determines a location of the mobile device 18 by communicating with a plurality of GPS satellites. The GPS 36 can perform known triangulation techniques to determine the GPS coordinates of the mobile device 18. It should be appreciated that while a GPS 36 is shown, any other suitable component for determining the location of the mobile device 18 can be implemented.

The display 38 of the mobile device 10 may be a graphical user interface (GUI) that displays products and information to be described. The GUI further includes a plurality of input objects which allow the user to provide commands to the mobile device 18. The display 38 on the mobile device 18 can display products and information to the user via the GUI. In some embodiments, the display 38 may display cue cards that ask questions of the customer and whether the customer intends to purchase the products. It should be appreciated that, in some embodiments, the user interface 30 and the display 38 may be one in the same.

Figure 4:
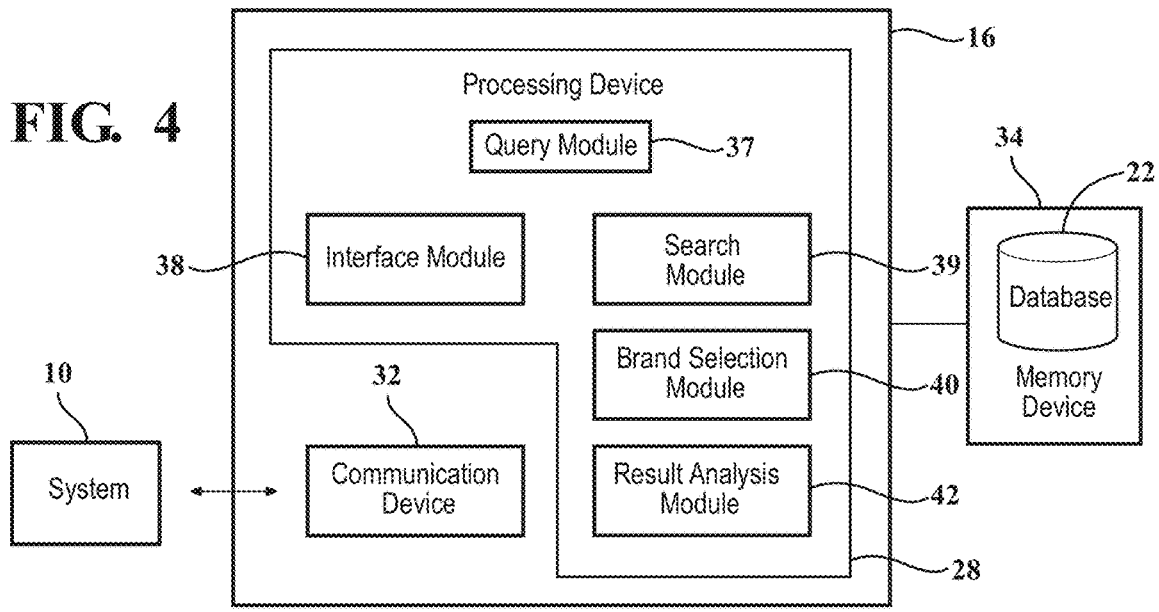
FIG. 4 is a diagrammatic view of one portion of the system of FIG. 1.

Referring to FIG. 4, the server computer 16 for querying the query database 22 may be configured to perform one or more functions at the request of the mobile device 18. In the illustrated embodiment, the query server computer 16 may include a processing device 28, a communication device 32, and memory device 34.

The processing device 28 can include memory, e.g., read only memory (ROM) and random access memory (RAM), storing processor-executable instructions and one or more processors that execute the processor-executable instructions. In embodiments where the processing device 28 includes two or more processors, the processors can operate in a parallel or distributed manner. In the illustrative embodiment, the processing device 28 executes one or more of a query module 37, an interface module 38, a search module 39, a brand determination module 40, and a result analysis module 42.

The communication device 32 is a device that allows the query server computer 16 to communicate with another device, e.g., the mobile device 18, via the network 20. The communication device 32 can include one or more wireless transceivers for performing wireless communication and/or one or more communication ports for performing wired communication. The communication device 32 is accessible to the processing device 28.

The memory device 34 is a device that stores data generated or received by the query server computer 16. The memory device 34 can include, but is not limited to a hard disc drive, an optical disc drive, and/or a flash memory drive. Further, the memory device 34 may be distributed and located at multiple locations. The memory device 34 is accessible to the processing device 28. In some embodiments, the memory device 34 stores the query database 22.

The query module 37 includes software and/or hardware modules implementing searching methods disclosed herein. In some embodiments, the modules and data of the query module 37 are implemented or accessed by the server system 14, query server computer 16, or some other entity that provides an interface to the query module 37.

The query module 37 may include the interface module 38 for receiving queries and transmitting responses to queries to a requesting entity. The interface module 38 may be part of a data flow such that a query input to the query module 37 is not received directly from, for example, the mobile device 18. For example, a query may be expanded or otherwise modified to include keywords associated with concepts identified in the query. The query may also be generated by some other software module executed by the server system 14. Whichever entity originated a query received by the interface module 38, the interface module 38 may route the search results to this requesting entity or to some other entity specified with the query.

The query module 37 may include the search module 39 that may search a corpus of documents, such as a database of records, over the Internet, or other corpus and return results relevant to a particular query. The search module 39 may implement any search algorithm, e.g. search engine, known in the art for identifying documents relevant to a query, from a simple keyword matching search to a more complex search with word sense disambiguation, contextual searching, or other strategy for identifying relevant documents.

The query module 37 may also include the brand selection module 40 that may select brands for use in one or both of filtering search results, organizing search results, and presenting search results to users. The brand selection module 40 may select brands corresponding to a product queried that is located in the retail store 12 using outputs from the result analysis module 42.

Figure 5:
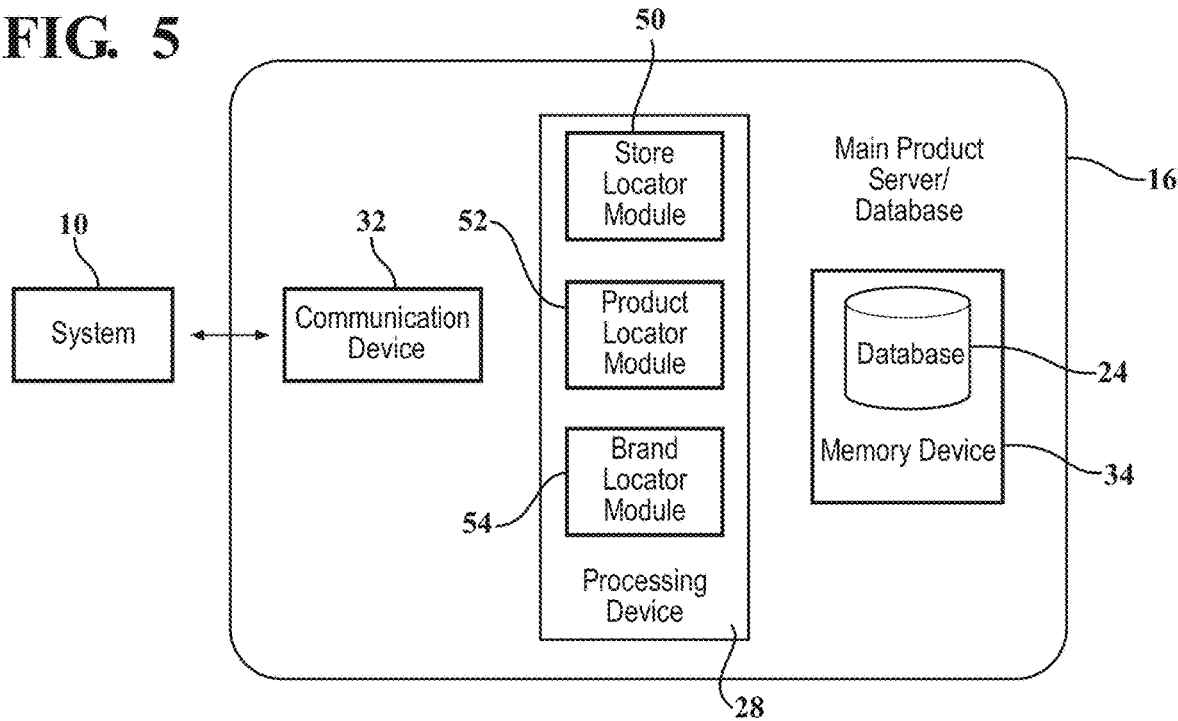
FIG. 5 is a diagrammatic view of another portion of the system of FIG. 1.

The query module 37 may also include the result analysis module 42. The brands that are useful in identifying relevant search results may be determined in part based on a composition of search results, specifically the number of product records corresponding to each brand present in the search results. Accordingly, the result analysis module 42 may evaluate search results in order to facilitate this determination. It should be appreciated that a different search database and/or store search algorithm could be used than that described Referring to FIG. 5, the main product server computer 16 for accessing the main product database 24 may be configured to perform one or more functions at the request of the mobile device 18. The product server computer 16 may be configured to perform one or more of the requested functions. In the illustrated embodiment, the product server computer 16 may include a processing device 28, a communication device 32, and memory device 34. It should be appreciated that the main product database 24 communicates with individual store product databases and is updated from them. It should also be appreciated that the main product database 24 can be updated by either polling the store product databases as a set frequency or by allowing the store product databases to push updates directly to the main product database 24. It should further be appreciated that, in other embodiments, the system 10 could query the actual store product database itself instead of the main product database 24.

The processing device 28 can include memory, e.g., read only memory (ROM) and random access memory (RAM), storing processor-executable instructions and one or more processors that execute the processor-executable instructions. In embodiments where the processing device 28 includes two or more processors, the processors can operate in a parallel or distributed manner. In the illustrative embodiment, the processing device 28 executes one or more of a store locator module 50, a product locator module 52, and a brand locator module 54.

The communication device 32 is a device that allows the product server computer 16 to communicate with another device, e.g., query server computer 16, customer server computer 16, and/or the mobile device 18, via the network 20. The communication device 32 can include one or more wireless transceivers for performing wireless communication and/or one or more communication ports for performing wired communication. The communication device 32 is accessible to the processing device 28.

The memory device 34 is a device that stores data generated or received by the product server computer 16. The memory device 34 can include, but is not limited to a hard disc drive, an optical disc drive, and/or a flash memory drive. Further, the memory device 34 may be distributed and located at multiple locations. The memory device 34 is accessible to the processing device 28. In some embodiments, the memory device 34 stores the product database 24.

In some embodiments, the memory device 34 stores a retail store location database that can store the retail store locations of one or more retail stores 12 operated or associated with a retailer. The retail store location database may be queried using a specific location, e.g., GPS coordinates, or a general location, e.g., postal zip code or city/state, and can return one or more retail stores 12 that are proximate to the specific or general location.

The product database 24 may further store a type of each product sold by the retailer, e.g., groceries, home decor, and personal goods, and/or a section of the product, e.g., dairy or men's clothing. In this way, the product database 24 can be queried with a store location of the retail store 12 and a product and can return a type or brand of the product and/or a section of the product at the store location of the retail store 12.

As discussed, the processing device 28 may execute the store locator module 50. The store locator module 50 receives a location from the mobile device 18 and determines one or more store locations of the retail stores 12 corresponding to the received location. In some embodiments, the store locator module 50 queries the store location database with the received location and receives the store location of the retail store 12 that correspond to the received location. When more than one store location is received, the store locator module 50 may automatically select the store location nearest to the received location or may provide the store locations to the mobile device 18, thereby allowing the mobile device 18 or the user or customer to select the store location of the retail store 12. It should be appreciated that the user or customer can choose their store location/address as well in case that they want to search a retail store different from the location the mobile device 18 is providing or if the mobile device 18 is not returning a store location.

Figure 6:
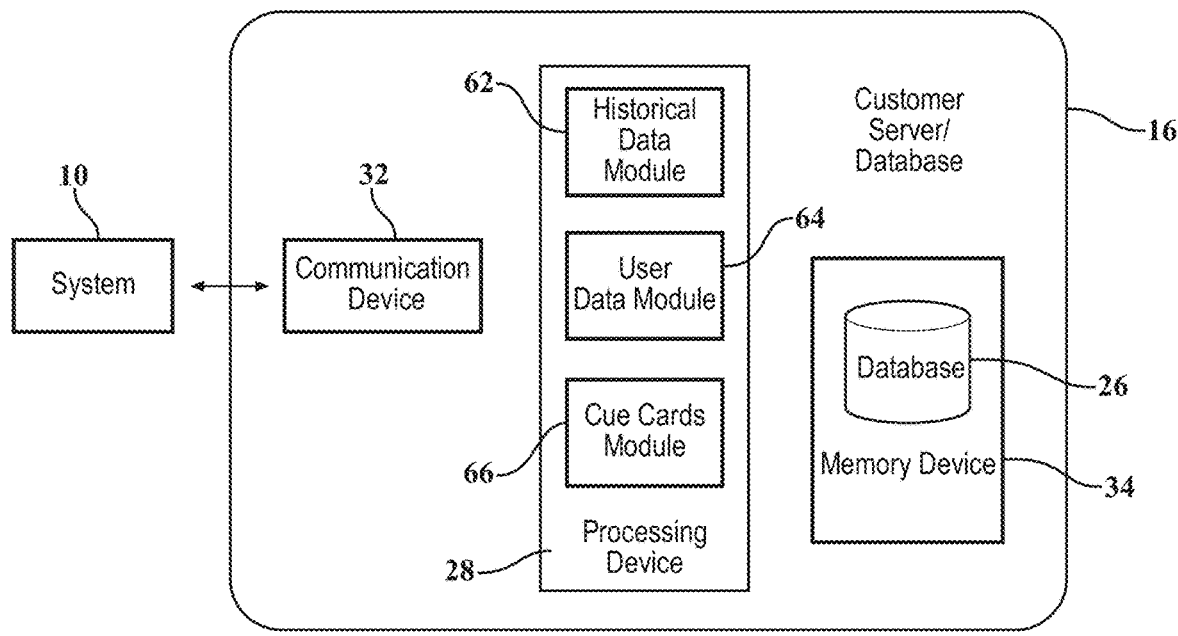
FIG. 6 is a diagrammatic view of yet another portion of the system of FIG. 1.

Referring now to FIG. 6, an example of the customer data server computer 16 accessing the customer database 26 is illustrated. In the illustrated example, the customer data server 16 includes, but is not limited to, a processing device 28, a communication device 32, and a memory device 34.

The processing device 28 can include memory, e.g., read only memory (ROM) and random access memory (RAM), storing processor-executable instructions and one or more processors that execute the processor-executable instructions. In embodiments where the processing device 28 includes two or more processors, the processors can operate in a parallel or distributed manner. In the illustrative embodiment, the processing device 28 executes one or more of a historical data module 62, user data module 64, and a cue card module 66.

The communication device 32 is a device that allows the customer data server computer 16 to communicate with another device, e.g., the server system 14, the server computers 16, and/or the mobile devices 18, via the communication network 20. The communication device 32 can include one or more wireless transceivers for performing wireless communication and/or one or more communication ports for performing wired communication. The communication device 32 is accessible to the processing device 28.

The memory device 34 can be any device that stores data generated or received by the customer server computer 16. The memory device 34 can include, but is not limited to a hard disc drive, an optical disc drive, and/or a flash memory drive. Further, the memory device 34 may be distributed and located at multiple locations. The memory device 34 is accessible to the processing device 28. In some embodiments, the memory device 34 stores the customer data database 26 of historical purchase data, user data, and cue card data.

In one embodiment, a data model and algorithm takes various data points, historical purchase data, user data, and cue card data and combines this data with various product clusters and categorization in order to predict which is the most probable item or product the customer is going to want or likely to add next to their grocery basket. The data model and algorithm uses recurrent neural networking with Tensorflow™ to build a specific machine leaning model to create a list of products to show the user that is grocery specific and built into the data model. It should be appreciated that TensorFlow™ is an open source software library for numerical computation using data flow graphs. It should also be appreciated that nodes in the graphs represent mathematical operations, while the graph edges represent multidimensional data arrays (tensors) communicated between them. It should further be appreciated that Tensor-Flow™ is known and commercially available. It should still further be appreciated that the unique and grocery specific classification of products and various clusters showing where products overlap are highly relatable, driven from historical purchase data and user data to create a unique product list for each new user.

Figure 7:
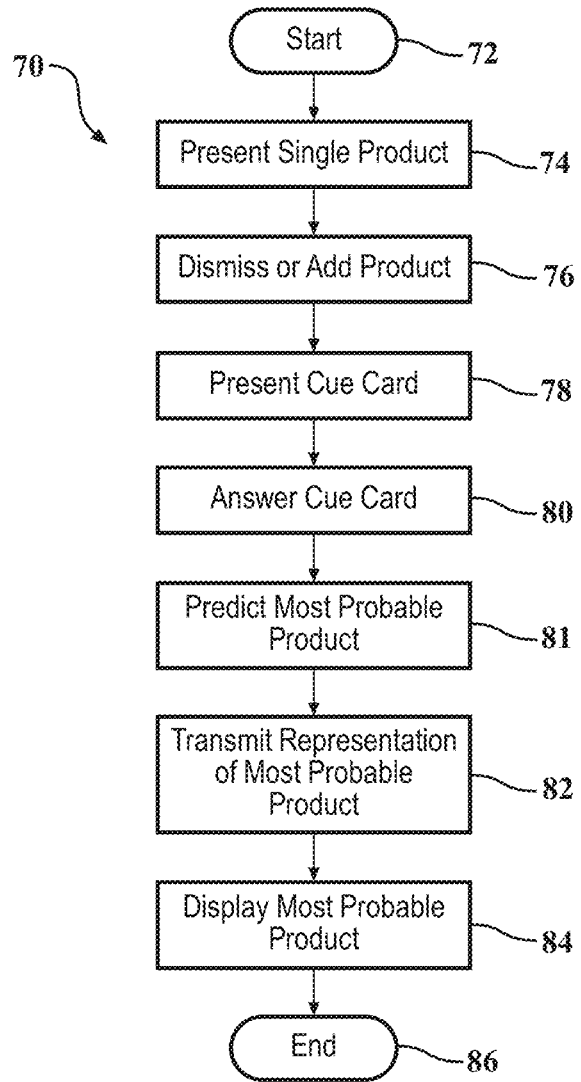
FIG. 7 is a flowchart of a method, according to one embodiment of the present invention, of using the system of FIGS. 1 through 6.

Referring now to FIG. 7, an example method 70, according to one embodiment of the present invention, using the system 10 for the retail store 12 with the mobile device 18 for building a grocery basket for the retail store 12 is illustrated. The method 70 can be executed by the components illustrated in FIGS. 1 through 6. In general, a flowchart of the method 70, according to one embodiment of the present invention, starts in bubble 72. The method 70 includes the steps of presenting a single product to be located in the retail store 12 to the customer using a mobile application running on the mobile device 18 in block 74. For example, presenting, by the system 10, a single product to be located in the retail store 12 to the customer using the user interface 30 on the mobile device 18. In addition, the method may provide the customer a search feature if the customer is looking for some specific product. For example, performing a search, by the system 10, on a plurality of products records corresponding to a plurality of products located in the retail store 12, which may include inputting the search query to any search algorithm known in the art. The corpus of documents searched may include a database of product records or some other corpus of documents, accessible over the Internet. It should be appreciated that the customer uses the search feature if the customer is looking for some specific product.

The method 70 also includes the step of receiving an indication from the customer either to dismiss the product or to add the product to the grocery basket of the mobile application to form user data in block 76. For example, receiving, by the system 10 from the mobile device 18, an indication from the customer by the customer using their finger to swipe to the left on the display 38 to dismiss the product from consideration or using their finger to swipe to the right on the display 38 to add the product to the grocery basket of the mobile application. The method 70 includes the steps of presenting a cue card to ask the customer a question in block 78. For example, presenting, by the system 10 to the mobile device 18, one or more cue cards to ask the customer about products, lifestyle, categories, etc. The method 70 includes the steps of receiving an answer from the customer as to yes or no to the question to form cue card data in block 80. For example, receiving, by the system 10 from the mobile device 18, an answer from the customer as to yes or no to the question by the customer using their finger on the user interface 30 of the mobile device 18 to swipe to the right on the display 38 to answer "no" or to swipe to the left on the display 38 to answer "yes". It should be appreciated that an indication from the customer may be reversed by the customer using their finger to swipe to the right or to the left on the display 38.

The method 70 includes the steps of using a data model and an algorithm to predict a most probable product the customer is going to want to add to the grocery basket on the mobile application in block 81. For example, using, by the system 10, recurrent neural network Tensorflow™, based on historical purchase data, the user data, and the cue card data to predict the most likely or probable product the user is going to want next to add to their grocery basket on the mobile application. The method 70 includes the steps of transmitting a representation of the most probable product in block 82. For example, transmitting, by the system 10, a representation of the most probable product to the mobile device 18. The method 70 further includes the steps of displaying the most probable product on the graphical display 38 of the mobile device 18, wherein the most probable product is based on the historical purchase data, the user data, and the cue card data in block 84. For example, displaying, by the system 10, the most probable product on the graphical display 38 of the mobile device 18. The method ends in block 86. It should be appreciated that the method may be repeated to collect enough data to build the grocery basket. It should also be appreciated that the method includes other steps such as providing the computer system and servers and coupling the servers to one another. It should further be appreciated that the flow can differ depending on implementation. It should still further be appreciated that the mobile application helps new users or customers build their initial grocery basket and learn about the users or customers preferences for future shops.

Figure 8:
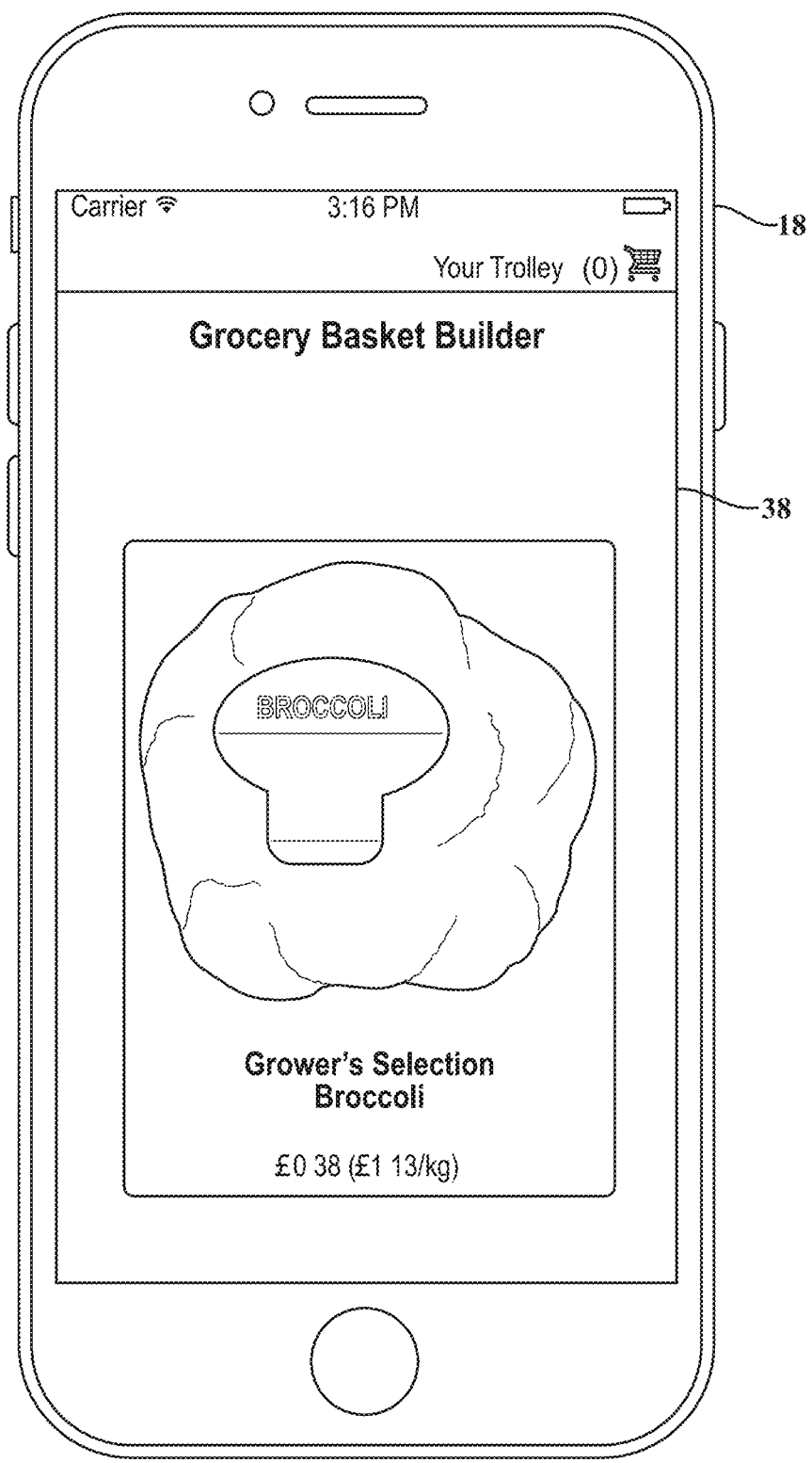
FIG. 8 is an illustration of an exemplary screenshot of a user interface on the mobile device of FIG. 3 used with the system of FIG. 1.
Figure 9:
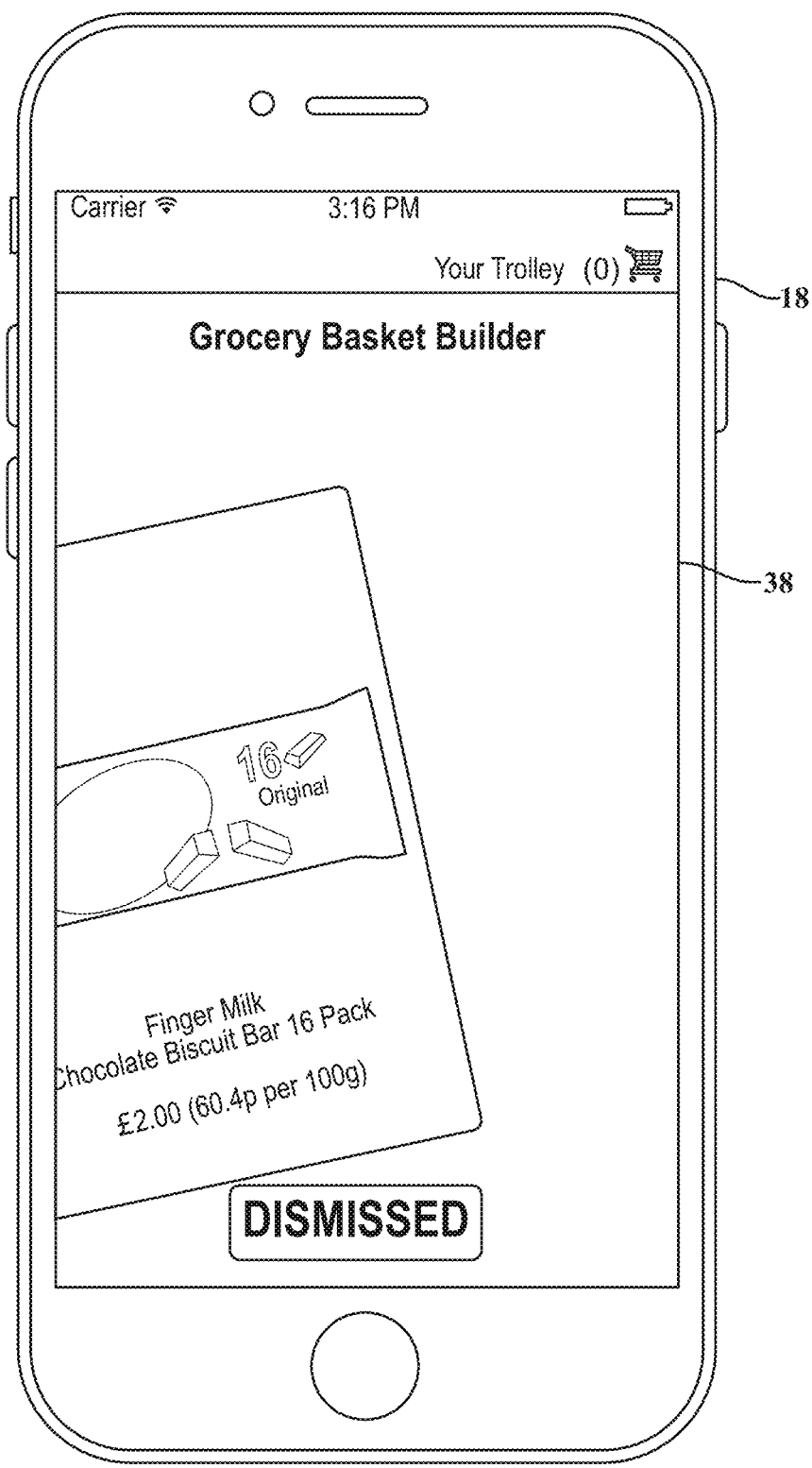
FIG. 9 is an illustration of another exemplary screenshot of the user interface on the mobile device of FIG. 3 used with the system of FIG. 1.

Referring to FIG. 8, the user interface 30 for the grocery basket builder on the mobile device 18 can display a product on the display 38 of the mobile device 18 to the customer. On the display 38, the product may be, for example, an image of broccoli and indicia identifying the type of broccoli for the retail store 12. As illustrated in FIG. 9, the user can use a single swipe to the left to dismiss the product from consideration such as "candy". In this example, the customer uses their finger to swipe to the left on the display 38 to dismiss the candy from consideration or from being added to their grocery basket. It should be appreciated that the user interface 30 is easy to use, shows only one product at a time, and has only two actions to either dismiss or add to the grocery basket. It should also be appreciated that the customer can access their grocery basket and adjust quantity or remove items or products and also return to the main section of the mobile application.

Figure 10:
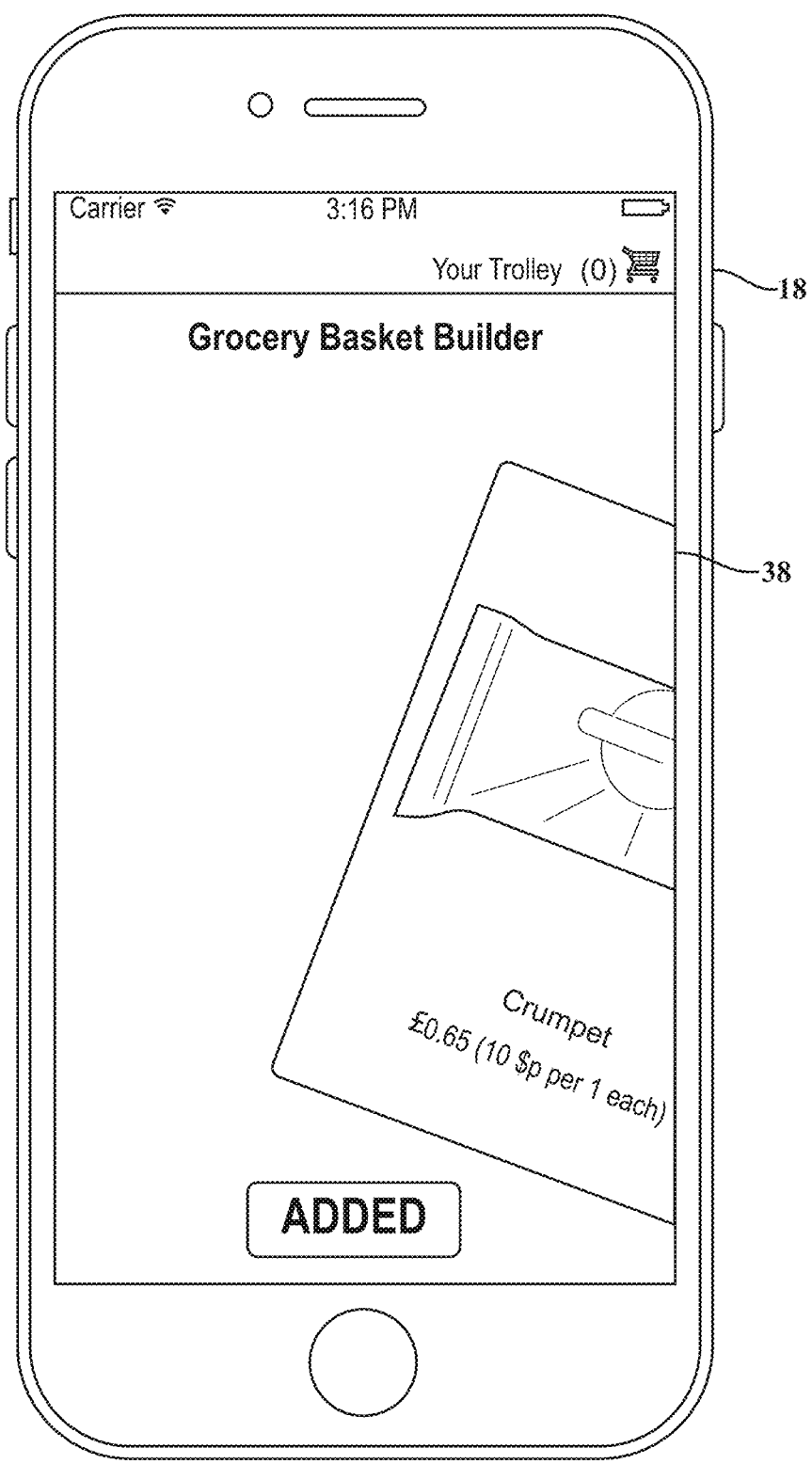
FIG. 10 is an illustration of yet another exemplary screenshot of the user interface on the mobile device of FIG. 3 used with the system of FIG. 1.

As illustrated in FIG. 10, the customer can use a single swipe to the right to add the product such as "crumpets" to their grocery basket. In this example, the user uses their finger to swipe to the right on the display 38 to add the crumpets to their grocery basket. It should be appreciated that, only one or a single product, is shown to keep the display 38 clean and easy for the user to understand. It should also be appreciated that the examples of FIGS. 8-10 are provided for example only and not intended to be limiting.

Figure 11:
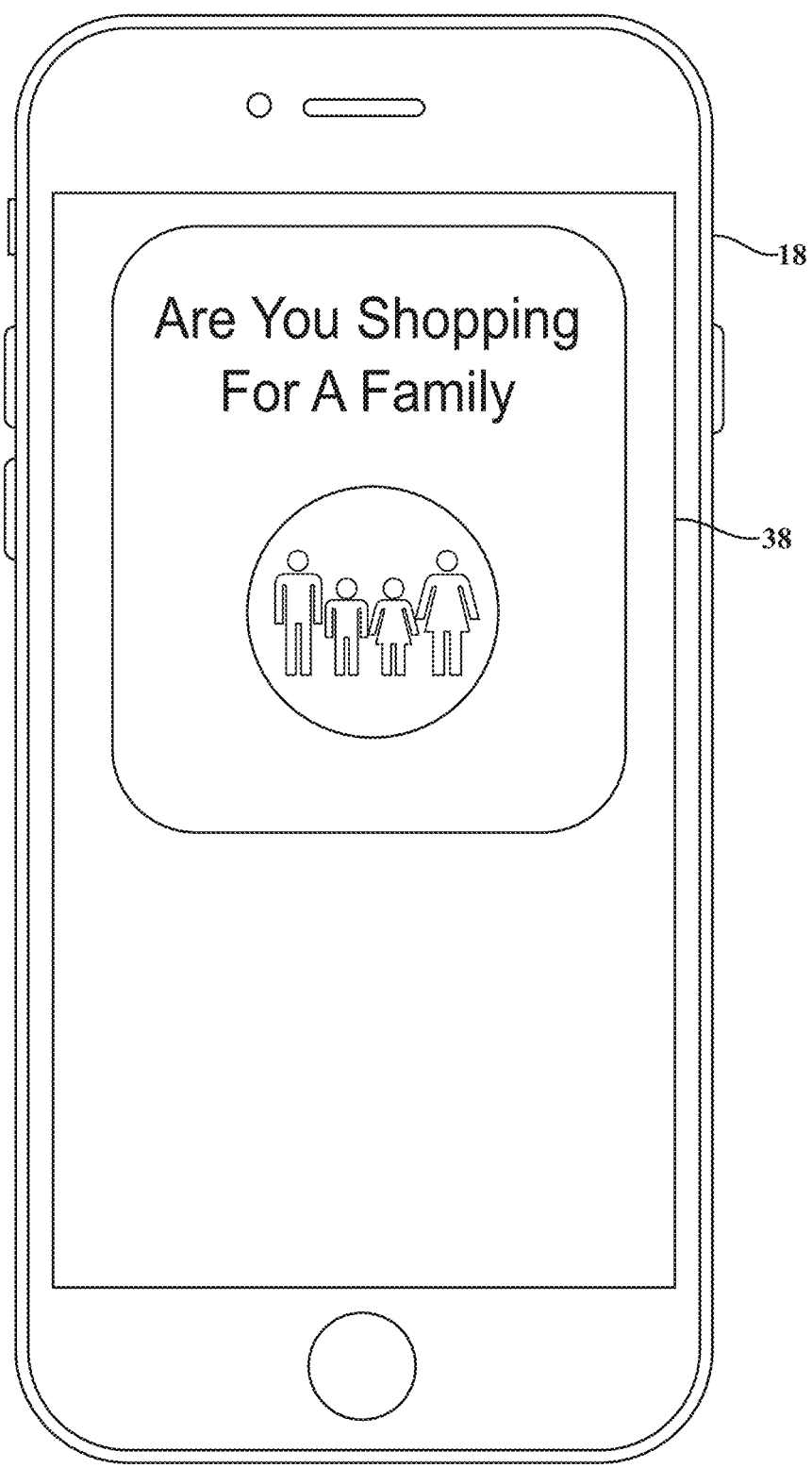
FIG. 11 is an illustration of still another exemplary screenshot of the user interface on the mobile device of FIG. 3 used with the system of FIG. 1.

Referring to FIG. 11, an example of a cue card that is presented to the customer with the user interface 30 on the display 38 of the mobile device 18 is shown. In one embodiment, the cue cards are action based. The cue cards are often shown after a series of actions that may provide insight on the user, e.g., if a user is adding a lot of larger items or products. For example, the cue card may ask "Are You Shopping for a Family?". The cue cards are always a "yes" or "no" answer. In one embodiment, the user answers the cue cards. The user answers the question presented by the cue card by simply swiping left or right to provide the answer much in the same way as adding a product. In one embodiment, the cue cards may be lifestyle based. The cue card can help the retailer understand certain aspects of the user's lifestyle. For example, "Are you a vegetarian?". In one embodiment, the cue cards may be category based. The cue cards can ask the user if they would like to continue shopping in a category or try something else. For example, "Do you need any more fruits?". It should be appreciated that the cue cards form small micro surveys to learn more about the customer and to feed this back into the data model. It should also be appreciated that the cue cards along with the historical purchase data and user actions help drive intelligence as to which products the retailer thinks are important to the customer and therefore most likely to be added to the grocery basket, which helps forms a product list.

Figure 12:
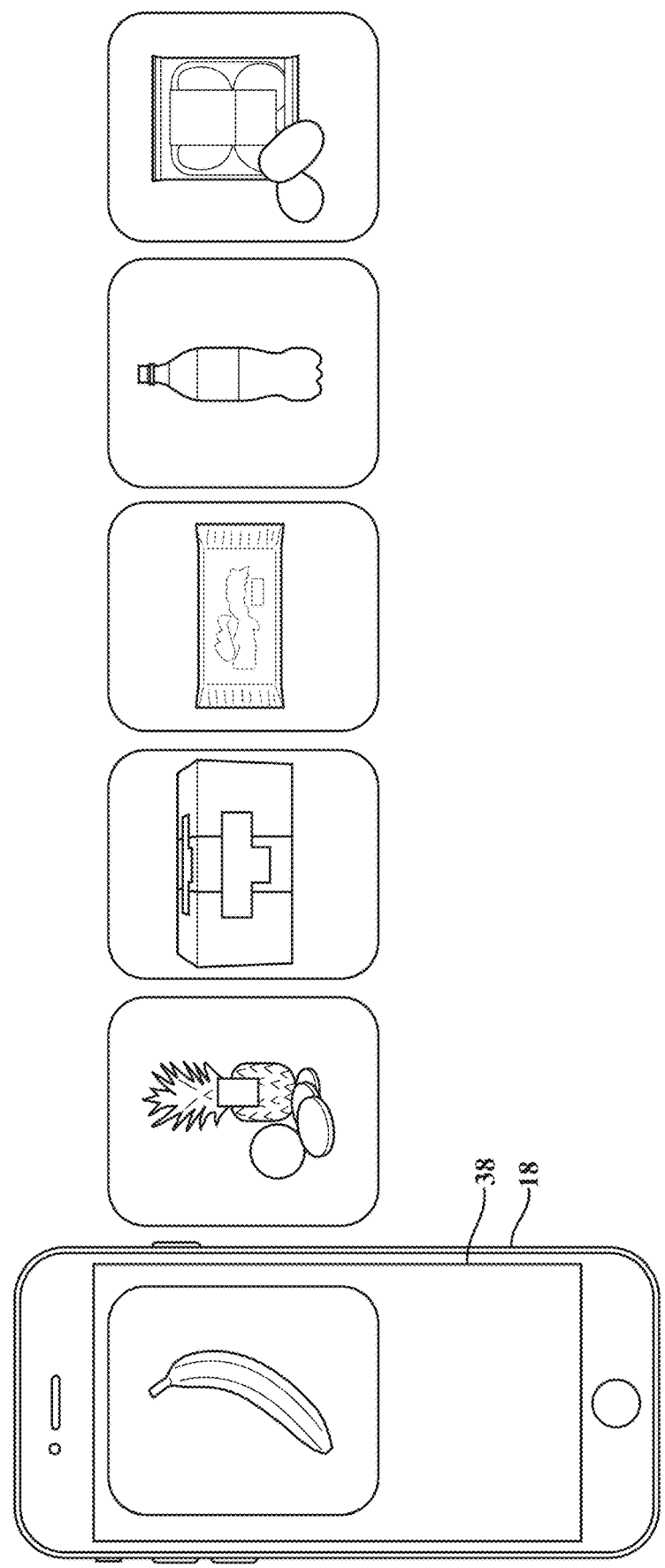
FIG. 12 is an illustration of a further exemplary screenshot of the user interface on the mobile device of FIG. 3 used with the system of FIG. 1.

Referring to FIG. 12, an example of a product list is shown. The product list is a machine learning model using recurrent neural network Tensorflow™ that tries to predict the most likely product the user is going to want next. The more accurate the product list is the less the user needs to interact with the mobile application and the more time is saved. The product list will even be influenced by the actions the user is making as they use the application or tool to provide real time data. For example, if a user dismisses bananas this may reduce the likelihood of the product list showing a banana milkshake. The product list may use the user history. Although this is aimed at a first time customer shopper, users are encouraged to continue using this feature for future shops and therefore the users own historical data will be used. The product list may use historical purchase data. A major driver of the product list will be a predetermined time period of historical purchase or add to basket data that looks at what products users buy and in what order. The product list may use cue cards. The data received from cue cards of users will influence the product shown in the product list. For example, if the user indicates they are shopping for a family, the data model will present large quantity items or products.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system comprising:
   one or more processors; and
   one or more non-transitory computer-readable media storing computing instructions configured to run on the one or more processors and perform:
   transmitting information of a retail store over a network to a mobile device of a customer, wherein the retail store is a brick-and-mortar store;
   building a grocery basket by presenting one or more products located in the retail store to the customer using a mobile application running on the mobile device, wherein the presenting the one or more products occurs by presenting each respective product of the one or more products displayed one at a time on a graphical user interface on the mobile device of the customer;
   receiving from the graphical user interface on the mobile device an indication from the customer either (i) swiping in a first direction on the each respective product on the graphical user interface to dismiss the each respective product or (ii) swiping in a second direction on the each respective product on the graphical user interface to add the each respective product to the grocery basket of the mobile application to form user data;
   sending instructions to display on the graphical user interface on the mobile device a cue card to ask the customer a question, wherein the cue card is displayed in response to a series of actions received by the graphical user interface on the mobile device of the customer, and wherein the cue card forms a micro survey of one or more micro surveys;
   receiving from the graphical user interface on the mobile device an answer from the customer either (i) swiping in a third direction on the graphical user interface to answer yes or (ii) swiping in a fourth direction on the graphical user interface to answer no to the question, wherein the answer is added to cue card data;
   generating, by using a machine learning model, an output comprising a most probable product of a plurality of products to add to the grocery basket, wherein input data for the machine learning model comprises historical purchase data and the user data across a predetermined time period, and wherein the user data and the cue card data are fed back into the machine learning model as the user data and the cue card data are updated; and
   sending instructions to display the most probable product on the graphical user interface on the mobile device, wherein the most probable product is based on at least the output generated by the machine learning model.

2. The system of claim 1, wherein the computing instructions are further configured to run on the one or more processors and perform:
   adjusting a quantity of the each respective product added to the grocery basket.

3. The system of claim 1, wherein swiping in the first direction on the each respective product on the graphical user interface to dismiss the each respective product comprises swiping left on the each respective product on the graphical user interface on the mobile device.

4. The system of claim 1, wherein swiping in the second direction on the each respective product on the graphical user interface to add the each respective product to the grocery basket comprises swiping right on the each respective product on the graphical user interface on the mobile device.

5. The system of claim 1, wherein swiping in the third direction on the graphical user interface to answer yes comprises swiping left on the graphical user interface on the mobile device.

6. The system of claim 1, wherein swiping in the fourth direction on the graphical user interface to answer no comprises swiping right on the graphical user interface on the mobile device.

7. The system of claim 1, wherein the computing instructions are further configured to run on the one or more processors and perform:
   producing a product list using the machine learning model using a recurrent neural network, to predict the most probable product of the plurality of products.

8. The system of claim 1, wherein the computing instructions are further configured to run on the one or more processors and perform:
   searching for the each respective product of the one or more products within the retail store using the graphical user interface on the mobile application on the mobile device.

9. The system of claim 8, wherein a search query is used to search for the each respective product of the one or more products in the retail store.

10. The system of claim 9, wherein a name of the each respective product of the one or more products is provided as part of the search query.

11. A method comprising:
    transmitting, by a computer system, information of a retail store over a network to a mobile device of a customer, wherein the retail store is a brick-and-mortar store;
    building a grocery basket, using the computer system, by presenting one or more products located in the retail store to the customer using a mobile application running on the mobile device, wherein the presenting the one or more products occurs by presenting each respective product of the one or more products displayed one at a time on a graphical user interface on the mobile device of the customer;
    receiving, by the computer system, from the graphical user interface on the mobile device an indication from the customer either (i) swiping in a first direction on the each respective product on the graphical user interface to dismiss the each respective product or (ii) swiping in a second direction on the each respective product on the graphical user interface to add the each respective product to the grocery basket of the mobile application to form user data;

sending instructions to display, by the computer system, to the graphical user interface on the mobile device, a cue card to ask the customer a question, wherein the cue card is displayed in response to a series of actions received by the graphical user interface on the mobile device of the customer, and wherein the cue card forms a micro survey of one or more micro surveys;

receiving, by the computer system, from the graphical user interface on the mobile device an answer from the customer either (i) swiping in a third direction on the graphical user interface to answer yes or (ii) swiping in a fourth direction on the graphical user interface to answer no to the question, wherein the answer is added to cue card data;

generating, by using a machine learning model, an output comprising a most probable product of a plurality of products to add to the grocery basket, wherein input data for the machine learning model comprises historical purchase data and the user data across a predetermined time period, and wherein the user data and the cue card data are fed back into the machine learning model as the user data and the cue card data are updated; and sending instructions for displaying, by the computer system, the most probable product on the graphical user interface on the mobile device, wherein the most probable product is based on at least the output generated by the machine learning model.

12. The method of claim 11, further comprises:
adjusting, by the computer system, a quantity of the each respective product added to the grocery basket.

13. The method of claim 11, wherein swiping in the first direction on the each respective product on the graphical user interface to dismiss the each respective product comprises swiping left on the each respective product on the graphical user interface on the mobile device.

14. The method of claim 11, wherein swiping in the second direction on the each respective product on the graphical user interface to add the each respective product to the grocery basket comprises swiping right on the each respective product on the graphical user interface of the mobile device.

15. The method of claim 11, wherein swiping in the third direction on the graphical user interface to answer yes comprises swiping left on the graphical user interface on the mobile device.

16. The method of claim 11, wherein swiping in the fourth direction on the graphical user interface to answer no comprises swiping right on the graphical user interface on the mobile device.

17. The method of claim 11, further comprising:
producing, by the computer system, a product list using the machine learning model using a recurrent neural network, to predict the most probable product of the plurality of products.

18. The method of claim 11, further comprising:
searching for the each respective product of the one or more products within the retail store, by the computer system, using the graphical user interface on the mobile application on the mobile device.

19. The method in claim 18, wherein a search query is used to search for the each respective product of the one or more products in the retail store.

20. One or more non-transitory computer-readable storage media, having computer-executable instructions embodied thereon, wherein when executed by at least one processor, the computer-executable instructions cause the processor to:
transmit information of a retail store over a network to a mobile device of a customer, wherein the retail store is a brick-and-mortar store;

build a grocery basket by presenting one or more products located in the retail store to the customer using a mobile application running on the mobile device, wherein the presenting the one or more products occurs by presenting each respective product of the one or more products displayed one at a time on a graphical user interface on the mobile device of the customer;

receive from the graphical user interface on the mobile device an indication from the customer either (i) swiping in a first direction on the each respective product on the graphical user interface to dismiss the each respective product or (ii) swiping in a second direction on the each respective product on the graphical user interface to add the each respective product to the grocery basket of the mobile application to form user data;

send instructions to display on the graphical user interface on the mobile application a cue card to ask the customer a question, wherein the cue card is displayed in response to a series of actions received by the graphical user interface on the mobile device of the customer, and wherein the cue card forms a micro survey of one or more micro surveys;

receive, from the graphical user interface on the mobile application, an answer from the customer either (i) swiping in a third direction on the graphical user interface to answer yes or (ii) swiping in a fourth direction on the graphical user interface to answer no to the question, wherein the answer is added to cue card data;

generate, by using a machine learning model, an output comprising a most probable product of a plurality of products to add to the grocery basket wherein input data for the machine learning model comprises historical purchase data and the user data across a predetermined time period, and wherein the user data and the cue card data are fed back into the machine learning model as the user data and the cue card data are updated; and send instructions to display the most probable product on the graphical user interface on the mobile application, wherein the most probable product is based on at least the output generated by the machine learning model.

* * * * *